(12) United States Patent
He et al.

(10) Patent No.: US 10,876,708 B1
(45) Date of Patent: Dec. 29, 2020

(54) OPTICAL ELEMENT AND LIGHTING LAMP WITH THE SAME

(71) Applicants: Self Electronics Co., Ltd., Zhejiang (CN); Wanjiong Lin, Zhejiang (CN); Self electronics USA Corporation, Norcross, GA (US)

(72) Inventors: Zuping He, Zhejiang (CN); Xiaoyun Liu, Zhejiang (CN); Kai Xu, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 0 days.

(21) Appl. No.: 16/827,088

(22) Filed: Mar. 23, 2020

(30) Foreign Application Priority Data

Jun. 19, 2019 (CN) .......................... 2019 1 0530024

(51) Int. Cl.
| | | |
|---|---|---|
| *F21V 5/04* | (2006.01) | |
| *F21V 3/04* | (2018.01) | |
| *F21Y 115/10* | (2016.01) | |
| *F21Y 103/10* | (2016.01) | |

(52) U.S. Cl.
CPC ............... *F21V 5/045* (2013.01); *F21V 3/04* (2013.01); *F21Y 2103/10* (2016.08); *F21Y 2115/10* (2016.08)

(58) Field of Classification Search
CPC .................................. F21V 5/045; F21V 3/04
USPC ......................................................... 362/223
See application file for complete search history.

(56) References Cited

U.S. PATENT DOCUMENTS

| | | | | |
|---|---|---|---|---|
| 7,083,313 B2* | 8/2006 | Smith | ............... | G02B 19/0061 362/555 |
| 7,329,029 B2* | 2/2008 | Chaves | .................... | G02B 3/06 257/E33.071 |
| 7,433,134 B2* | 10/2008 | Chou | ................. | G02B 19/0071 359/712 |
| 7,438,444 B2* | 10/2008 | Pao | .................... | G02B 19/0071 362/327 |
| 7,637,647 B2* | 12/2009 | Chen | ................. | G02F 1/133611 362/613 |
| 7,988,337 B2* | 8/2011 | Huang | .................. | F21V 7/0091 362/299 |
| 8,231,248 B2* | 7/2012 | Fu | ........................ | F21V 7/0091 362/311.02 |
| 2004/0246606 A1* | 12/2004 | Benitez | .................... | G02B 3/02 359/858 |
| 2006/0081863 A1* | 4/2006 | Kim | ........................ | H01L 33/54 257/98 |
| 2006/0091418 A1* | 5/2006 | Chew | ..................... | H01L 33/54 257/100 |

(Continued)

*Primary Examiner* — Bryon T Gyllstrom
(74) *Attorney, Agent, or Firm* — Wang Law Firm, Inc.

(57) ABSTRACT

An optical element has at least one strip-shaped optical lens, the optical lens has a light source setting portion, a light incident surface, two first total reflection surface, two first light emitting surface and two second total reflection surface; the two second total reflection surfaces are set to tilt outwards so that the large-angle light are reflected to the direction of the small-angle light; and two second light emitting surface, respectively disposed on the two sides of the central axis and located between the second total reflection surface and the first light emitting surface on the same side; the second light emitting surfaces are used to emit the reflected light of the second total reflection surface from the same side.

11 Claims, 3 Drawing Sheets

(56) References Cited

U.S. PATENT DOCUMENTS

| | | | | |
|---|---|---|---|---|
| 2006/0138437 A1* | 6/2006 | Huang | ............. | G02F 1/133606 |
| | | | | 257/98 |
| 2010/0195335 A1* | 8/2010 | Allen | ................ | G02B 27/0955 |
| | | | | 362/309 |
| 2013/0003363 A1* | 1/2013 | Lu | ........................ | F21V 7/0091 |
| | | | | 362/217.02 |

* cited by examiner

OPTICAL ELEMENT AND LIGHTING LAMP WITH THE SAME

RELATED APPLICATION

This application claims priority to a Chinese Patent Application No. CN 201910530024.0, filed on Jun. 19, 2019.

FIELD OF THE TECHNOLOGY

The present invention relates to the field of lighting technology, with particular emphasis on an optical element and a lighting lamp with the optical element.

BACKGROUND OF THE INVENTION

With the popularization of LED lamps, LED lamps are used in more and more occasions, such as bedroom, kitchen, living room and other home lighting, as well as commercial lighting such as freezer, cold chain, shelves.

As a point light source, the light intensity distribution of the LED chip is fixed. However, in actual use, it needs to achieve focused or large area of uniform lighting. For this reason, in the prior art, in order to achieve the required light intensity distribution, an optical element is generally arranged in the light emitting direction of the LED chip for light distribution.

With the development of lighting technology, new requirements have also been raised, such as the miniaturization of the volume, and at the same time, a large area of uniform lighting is required. At this time, the existing lamps cannot meet the demands.

BRIEF SUMMARY OF THE INVENTION

In view of this, the present invention provides an optical element and a lighting lamp with the optical element to solve the above technical problems.

An optical element comprising at least one strip-shaped optical lens, characterized in that, in a cross section perpendicular to a length direction, the optical lens comprises:

a light source setting portion, provided for setting the light source with a central axis;

a light incident surface, disposed facing the light source setting portion; and incident light rays of the light source comprise small-angle light rays and large-angle light rays;

two first total reflection surface, located on opposite sides of the light incident surface and are respectively disposed on both sides of the central axis; the two ends of the two first total reflection surfaces close to the light source setting portion are close to each other, the small-angle light rays emitted to the first total reflection surfaces is reflected completely;

two first light emitting surface, arranged on both sides of the two first total reflection surfaces in a direction perpendicular to the central axis for emitting reflected light from the first total reflection surfaces on the same side;

two second total reflection surface, located on opposite sides of the light incident surface and are respectively disposed on both sides of the central axis; the two second total reflection surfaces are set to tilt outwards so that the large-angle light are reflected to the direction of the small-angle light;

and two second light emitting surface, respectively disposed on the two sides of the central axis and located between the second total reflection surface and the first light emitting surface on the same side; the second light emitting surfaces are used to emit the reflected light of the second total reflection surface from the same side.

an irradiating surface perpendicular to the central axis is provided. For the irradiating surface, if there is no optical lens, the light at the middle position is the strongest and gradually weakens on both sides. By setting the optical lens in the lighting lamp of this embodiment, the small-angle light ray that is irradiated to the middle position are totally reflected to both sides and emitted through the first light emitting surface, and the large-angle light rays irradiated to both sides are totally reflected to the middle position through the second total reflection surface and emitted through the second light emitting surface 106 to achieve the goal of uniform illumination.

In order to facilitate the distribution of light from the light source and more easily complete the distribution of light to achieve the purpose of uniform lighting, advantageously, the light incident surface comprises a small-angle light ray incident surface, which is a condenser lens disposed in the middle;

and two large-angle light ray incident surfaces, which are plane mirrors respectively disposed on two sides of the central axis and corresponding to the second total reflection surfaces.

In order to facilitate manufacturing, advantageously, the second total reflection surface is disposed outside the corresponding large-angle light ray incident surface to reflect all the large-angle light rays.

In order to facilitate the adjustment of the light path direction of small-angle light rays and achieve better uniformity of light, advantageously, the first total reflection surface is disposed outside the small-angle light ray incident surface to reflect all converged small-angle light ray.

In order to facilitate the adjustment of the light path direction of the light source and achieve better uniformity of light, advantageously, the first total reflection surface and the first light emitting surface are connected to form an acute angle.

In order to facilitate the adjustment of the light path direction of the light source and achieve better uniformity of light, advantageously, the second total reflection surface (105) and the second light emitting surface are connected to form an acute angle.

In order to facilitate the adjustment of the light path direction of the light source and make the light uniformity better, advantageously, the first light emitting surface and the second light emitting surface are connected to form an obtuse angle.

In order to achieve encapsulation and waterproofing, advantageously, the optical element further comprises a strip-shaped lamp cover disposed outside the optical lens.

In order to achieve a linear light source effect, advantageously, the optical element further comprises a light diffusion film that stretches light rays emitted from the light source along a length direction of the optical lens.

In order to facilitate manufacturing and achieve a good line light source effect, advantageously, the light diffusion film is disposed between the optical lens and the strip-shaped lamp cover.

A lighting lamp, comprising a lamp holder, printed circuit boards and light sources, the light source is disposed at the light source setting portion.

In order to increase the illumination range, advantageously, the light source is provided in plurality and is arranged at intervals along the length direction of the printed circuit board.

In the context of energy saving and environmental protection, LED lamps are increasingly used in the field of home and commercial lighting because of their high light emitting efficiency and good light collection performance. Advantageously, LED chips are used as the light source.

Technical Effects of the Invention

The optical element and the lighting lamp with the optical element of the present invention totally reflect small-angle light rays in the middle of the light source to both sides, and totally reflect large-angle light rays on both sides to the middle, thereby obtaining a wider range of illumination and more even lighting.

BRIEF DESCRIPTION OF THE DRAWINGS

The following describes embodiments of the present invention with reference to the accompanying drawings, in which.

DETAILED DESCRIPTION OF THE INVENTION

Figure 1:
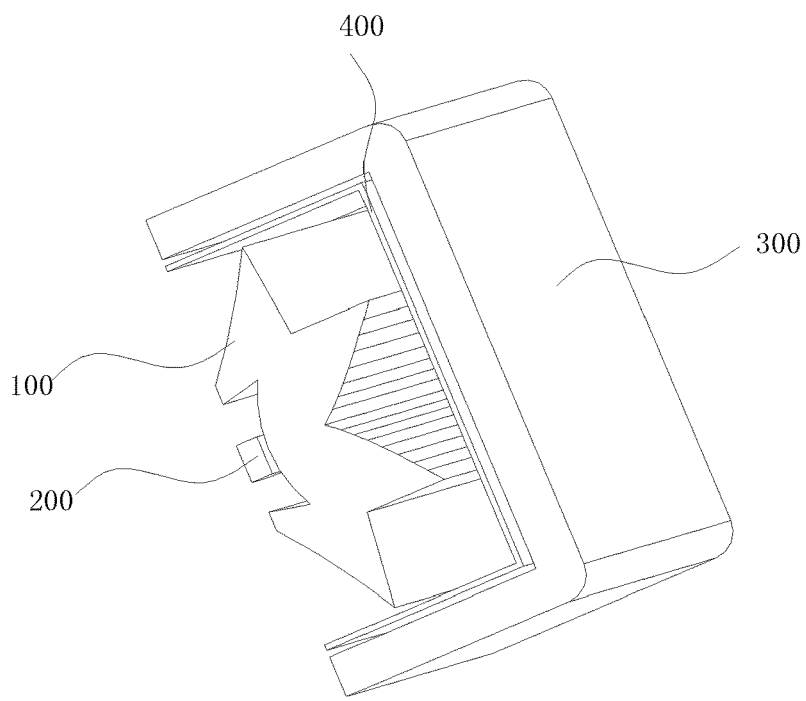
FIG. 1 is a schematic structural diagram of a lamp of the present invention.
Figure 2:
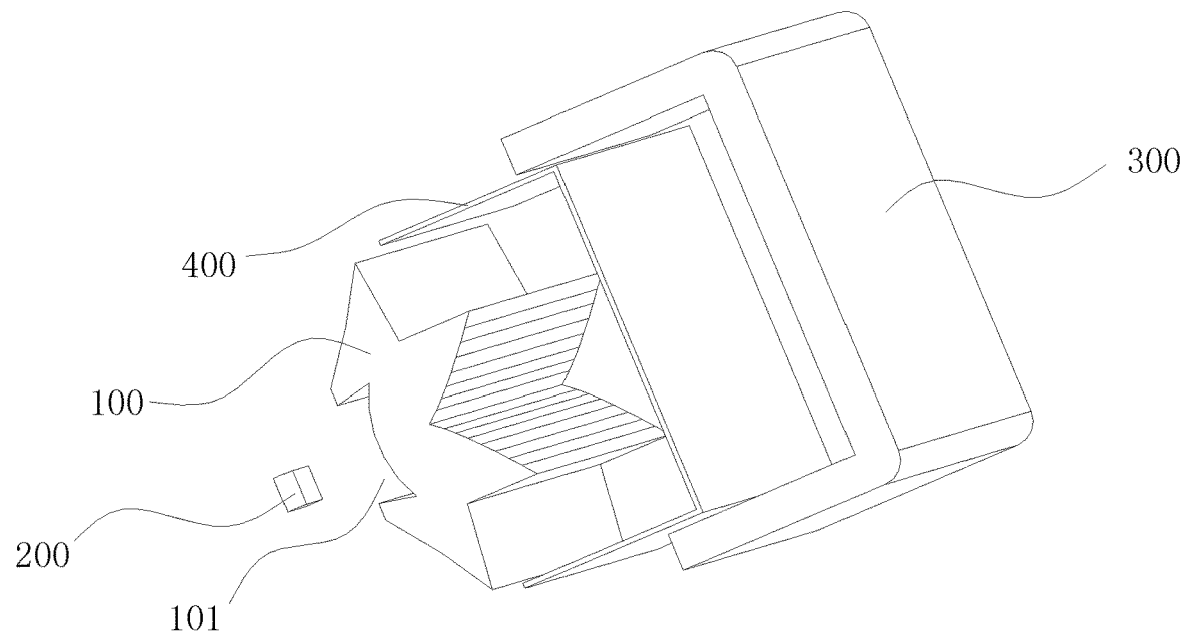
FIG. 2 is a schematic diagram of an exploded structure of a lamp of the present invention.
Figure 3:
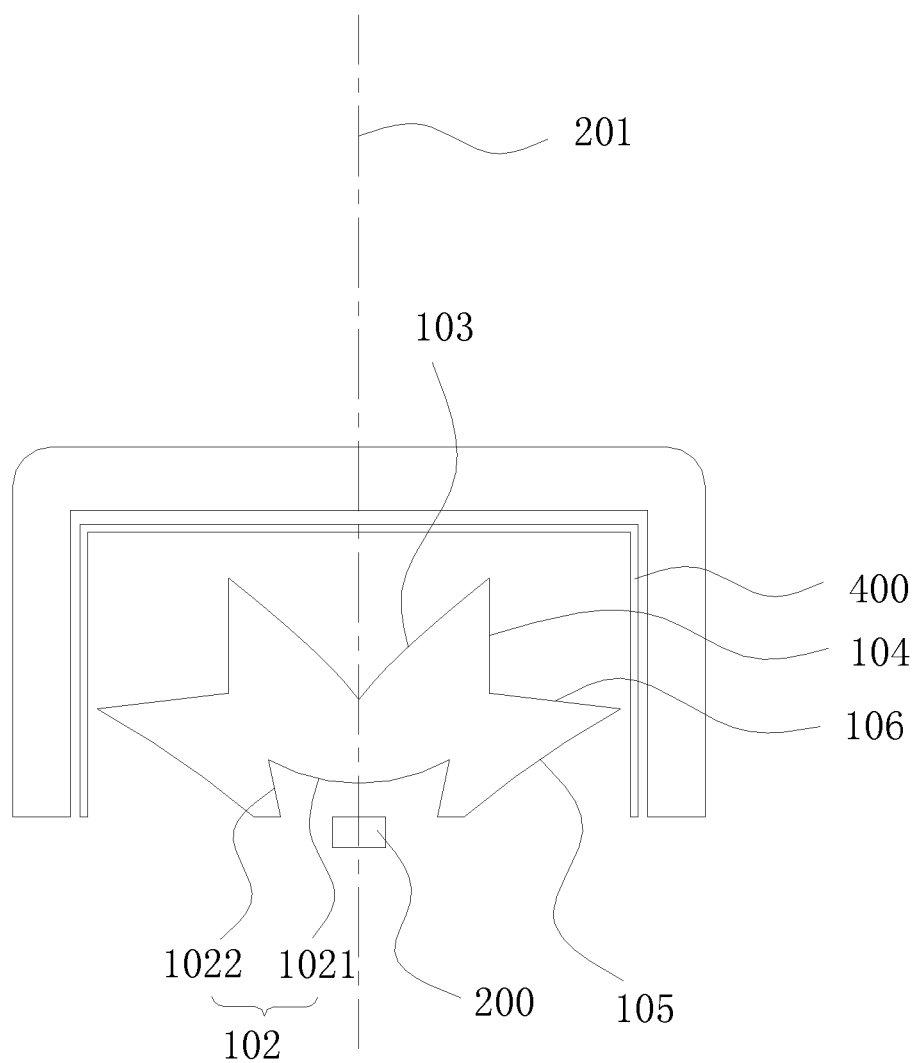
FIG. 3 is a schematic sectional structural view of a lamp of the present invention.
Figure 4:
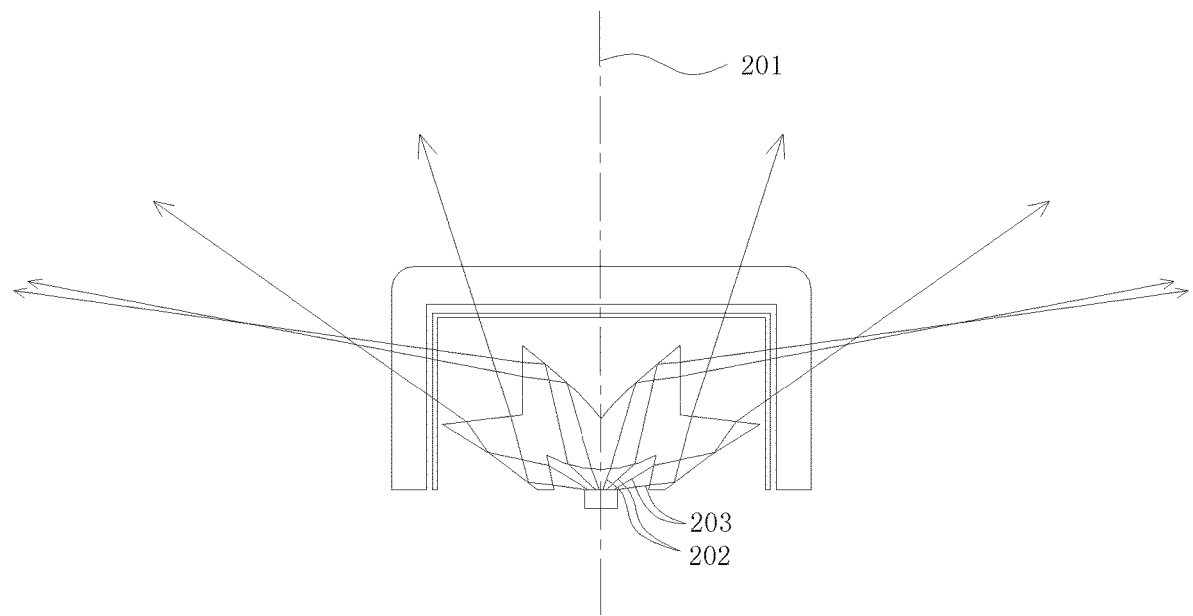
FIG. 4 is a schematic diagram of the light direction of the lamp of the present invention.

Hereinafter, specific embodiments of the present invention will be described in further detail based on the drawings. It should be understood that the description of the embodiments of the present invention is not intended to limit the protection scope of the present invention.

As shown in FIGS. 1 to 4, the lighting lamp of this embodiment includes a lamp holder, a printed circuit board, an optical element, and a light source 200. The lamp holder and the printed circuit board are not the technical points of the present invention, which are not shown in the figures, and the structures in the prior art may be adopted, which will not be described in detail here.

The optical element is used to adjust the light emitting direction and the light emitting angle of the light source, and the optical element includes at least one strip-shaped optical lens 100. In this embodiment, in order to simplify the structure, only one optical lens 100 is provided. On the cross section perpendicular to the length direction of the lamp, the optical lens 100 includes a light source setting portion 101, light incident surface 102, first total reflection surface 103, first light emitting surface 104, a second total reflection surface 105, and a second light emitting surface 106.

The light source setting portion 101 is provided for setting the light source 200 with a central axis 201. The light source 200 is one or more and arranged at intervals along the length direction of the printed circuit board (also the length direction of the optical lens 100). In the context of energy saving and environmental protection, LED lamps are increasingly used in the field of home and commercial lighting because of their high light emitting efficiency and good light collection performance. The light source 200 uses LED chips.

The light rays emitted from the light source 200 are divided into a small-angle light ray 202 located on the central axis 201 and both sides thereof, and a large-angle light ray 203 located on both sides of the small-angle light rays 202. The actual specific angle value can be set artificially as required.

The light incident surface 102 is disposed facing the light source setting portion 101, and the incident light rays of the light source 200 include small-angle light rays 202 and large-angle light rays 203.

Two first total reflection surfaces 103 are located on opposite sides of the light incident surface 102 and are respectively disposed on both sides of the central axis 201. The two ends of the two first total reflection surfaces 103 close to the light source setting portion 101 are close to each other, the small-angle light rays 202 emitted to the first total reflection surfaces 103 is reflected completely. The first total reflection surfaces 103 are disposed on the light path of the small-angle light rays 202. The first total reflection surface 103 is a plane, an arc surface, or a combination of planes or arc surfaces. In this embodiment, in order to improve the light distribution effect, the first total reflection surface 103 is composed of a plurality of arc surfaces.

The two first total reflection surfaces 103 close to each other can be connected or not connected. In the case of no connection, there is a gap between the two first total reflection surfaces 103. The gap area allows light to be emitted or not. In the case of connection, the small-angle light rays 202 on both sides of the central axis 201 are completely reflected, so all the small-angle light rays 202 are reflected to the direction of the high-angle light rays 203. Two light emitting surfaces 104 are arranged on both sides of the two first total reflection surfaces 103 in a direction perpendicular to the central axis 201 for emitting reflected light from the first total reflection surfaces 103 on the same side.

Two second total reflection surfaces 105 are located on opposite sides of the light incident surface 102 and are respectively disposed on both sides of the central axis 201, The two second total reflection surfaces 105 are set to tilt outwards so that the large-angle light ray 203 are reflected to the direction of the small-angle light rays 202. The second total reflection surfaces 105 are provided on the light path of the large-angle light rays 203.

Two second light emitting surfaces 106 are respectively disposed on the two sides of the central axis 201 and located between the second total reflection surface 105 and the first light emitting surface 104 on the same side. The second light emitting surfaces 106 are used to emit the reflected light of the second total reflection surface 105 from the same side.

For the irradiating surface, if there is no optical lens 100, the light at the middle position is the strongest and gradually weakens on both sides. By setting the optical lens 100 in the lighting lamp of this embodiment, the small-angle light ray 202 that is irradiated to the middle position are totally reflected to both sides and emitted through the first light emitting surface 104, and the large-angle light rays 203 irradiated to both sides are totally reflected to the middle position through the second total reflection surface 105 and emitted through the second light emitting surface 106 to achieve the goal of uniform illumination.

Due to the size change of the optical lens 100 and the influence of the distance and area of the irradiating surface, the angles of the first total reflection surface 103, the first light emitting surface 104, the second total reflection surface 105 and the second light emitting surface 106 with respect to the irradiating surface can be set as required to achieve the purpose of uniform lighting.

The light incident surface 102 can adjust the light for the first time, which is conducive to more efficient light distribution in the subsequent two sets of total reflection surfaces and further makes the light uniform. The light incident surface 102 includes a small-angle light ray incident surface 1021 and two large-angle light ray incident surface 1022. The small-angle light ray incident surface 1021 is a condenser lens disposed in the middle; the two large-angle light ray incident surfaces 1022 are planar mirrors respectively disposed on two sides of the central axis 201 and corresponding to the second total reflection surface 105. The small-angle light ray incident surface 1021 is used to limit the angle range of the small-angle light ray. The small-angle light ray incident surface 1021 converge the small-angle light ray 202. The first total reflection surface 103 is disposed outside the small-angle light ray incident surface 1021 to reflect all converged small-angle light ray 202.

The second total reflection surface 105 is disposed outside the corresponding large-angle light ray incident surface 1022 to reflect all the large-angle light rays 203. The first total reflection surface 103 and the first light emitting surface 104 are connected to form an acute angle. The second total reflection surface 105 and the second light emitting surface 106 are connected to form an acute angle. The first light emitting surface 104 is connected to the second light emitting surface 106 to form an obtuse angle.

The optical element further includes a strip-shaped lamp cover 300 disposed outside the optical lens 100. The optical element further includes a light diffusing film 400 that stretches the light emitted from the light source 200 along the length direction of the optical lens 100. The light diffusion film 400 is provided between the optical lens 100 and the strip-shaped lamp cover 300. The light source 200 is provided in plurality, and is arranged at intervals along the length direction of the printed circuit board.

Figure 5:
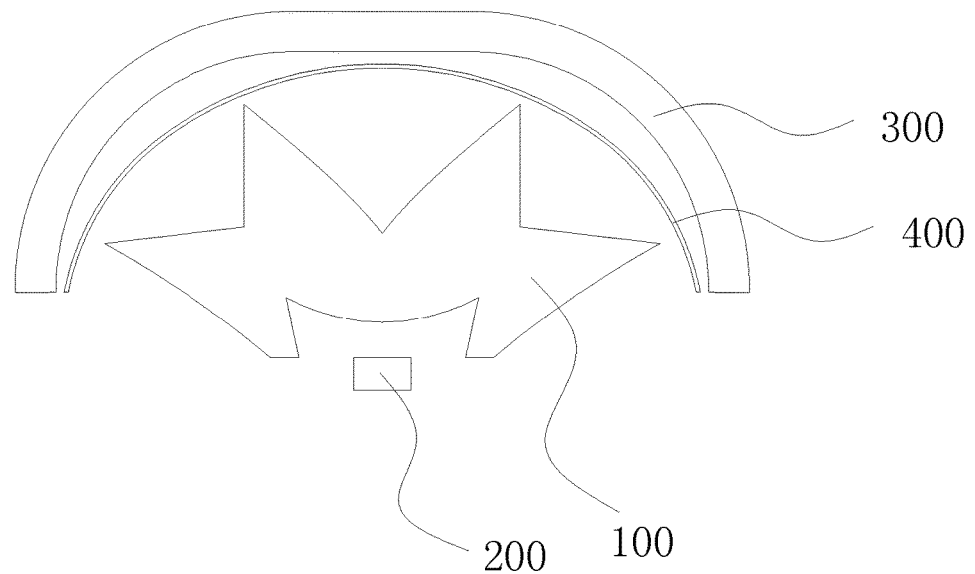
FIG. 5 is a sectional structure diagram of a lamp in another embodiment of the invention.

The cross section of the strip-shaped lamp cover 300 is rectangular, as shown in FIGS. 1 to 4, or arc-shaped, as shown in FIG. 5, and it can be selected according to the needs of installation and external structure.

In order to facilitate manufacturing and installation, the light diffusing film 400 of this embodiment is disposed between the optical lens 100 and the strip-shaped lamp cover 300.

The light diffusing film 400 is an elliptical light diffusing film, which can be obtained through purchase. The used model is E-6010. Of course, other models can also be selected like E-1560, E-0160/6001, E-0190, as long as the light source 200 is stretched in the direction in which the light source 200 is arranged. In order to achieve a better stretching and diffusion effect, when this light diffusion film is selected, the stretching ratio in both directions is greater than 4.

The elliptical light diffusing film of this embodiment is a positive cylindrical microlens array. When used, the length direction of the positive cylindrical microlenses is perpendicular to the arrangement direction of the light sources 200. The strip-shaped convex lens array in the form of a film is small in size, convenient for installation, and can be bent to fit different structural requirements of lamps.

The above disclosure has been described by way of example and in terms of exemplary embodiment, and it is to be understood that the disclosure is not limited thereto. Rather, any modifications, equivalent alternatives or improvement etc. within the spirit of the invention are encompassed within the scope of the invention as set forth in the appended claims.

What is claimed is:

1. An optical element comprising at least one strip-shaped optical lens (100), characterized in that, in a cross section perpendicular to a length direction, the optical lens (100) comprises:
   a light source setting portion (101), provided for setting the light source (200) with a central axis (201);
   a light incident surface (102), disposed facing the light source setting portion (101);
   and incident light rays of the light source (200) comprise small-angle light rays (202) and large-angle light rays (203);
   two first total reflection surface (103), located on opposite sides of the light incident surface (102) and are respectively disposed on both sides of the central axis (201); the two ends of the two first total reflection surfaces (103) close to the light source setting portion (101) are close to each other, the small-angle light rays (202) emitted to the first total reflection surfaces (103) is reflected completely;
   two first light emitting surface (104), arranged on both sides of the two first total reflection surfaces (103) in a direction perpendicular to the central axis (201) for emitting reflected light from the first total reflection surfaces (103) on the same side;
   two second total reflection surfaces (105), located on opposite sides of the light incident surface (102) and are respectively disposed on both sides of the central axis (201); the two second total reflection surfaces (105) are set to tilt outwards so that the large-angle light ray (203) are reflected to the direction of the small-angle light ray (202);
   and two second light emitting surfaces (106), respectively disposed on the two sides of the central axis (201) and located between the second total reflection surface (105) and the first light emitting surface (104) on the same side; the second light emitting surfaces (106) are used to emit the reflected light of the second total reflection surface (105) from the same side;
   wherein the second total reflection surface (105) and the second light emitting surface (106) are connected to form an acute angle.

2. The optical element as claimed in claim 1, wherein the light incident surface (102) comprises
   a small-angle light ray incident surface (1021), which is a condenser lens disposed in the middle;
   and two large-angle light ray incident surfaces (1022), which are plane mirrors respectively disposed on two sides of the central axis (201) and corresponding to the second total reflection surfaces (105).

3. The optical element as claimed in claim 2, wherein the second total reflection surface (105) is disposed outside the corresponding large-angle light ray incident surface (1022) to reflect all the large-angle light rays (203).

4. The optical element as claimed in claim 2, wherein the first total reflection surface (103) is disposed outside the small-angle light ray incident surface (1021) to reflect all converged small-angle light ray (202).

5. The optical element as claimed in claim 1, wherein the first total reflection surface (103) and the first light emitting surface (104) are connected to form an acute angle.

6. The optical element as claimed in claim 1, wherein the first light emitting surface (104) and the second light emitting surface (106) are connected to form an obtuse angle.

7. The optical element as claimed in claim 1, wherein the optical element further comprises a strip-shaped lamp cover (300) disposed outside the optical lens (100).

8. The optical element as claimed in claim 7, wherein the optical element further comprises a light diffusion film (400) that stretches light rays emitted from the light source (200) along a length direction of the optical lens (100).

9. The optical element as claimed in claim 8, wherein the light diffusion film (400) is disposed between the optical lens (100) and the strip-shaped lamp cover (300).

10. A lighting lamp, comprising a lamp holder, printed circuit boards and light sources (200), further comprising an optical element as claimed in claim 1, wherein the light source (200) is disposed at the light source setting portion (101).

11. The lighting lamp as claimed in claim 10, wherein the light source (200) is provided in plurality and is arranged at intervals along the length direction of the printed circuit board.

\* \* \* \* \*